July 15, 1952  R. E. LINDEMANN  2,603,290
TRIMMING APPARATUS
Filed April 29, 1949
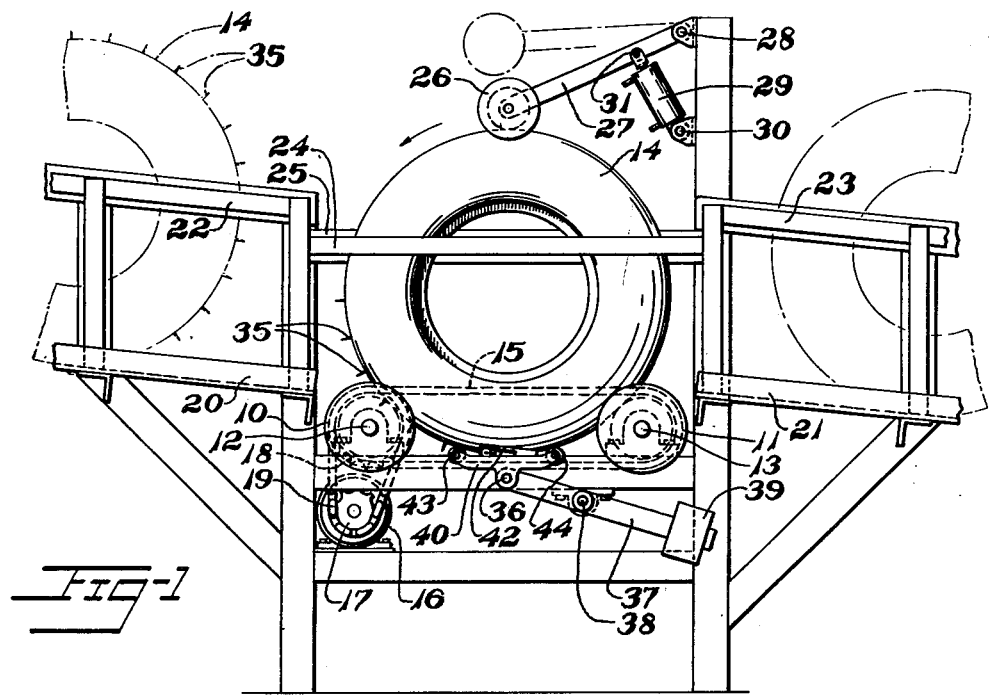
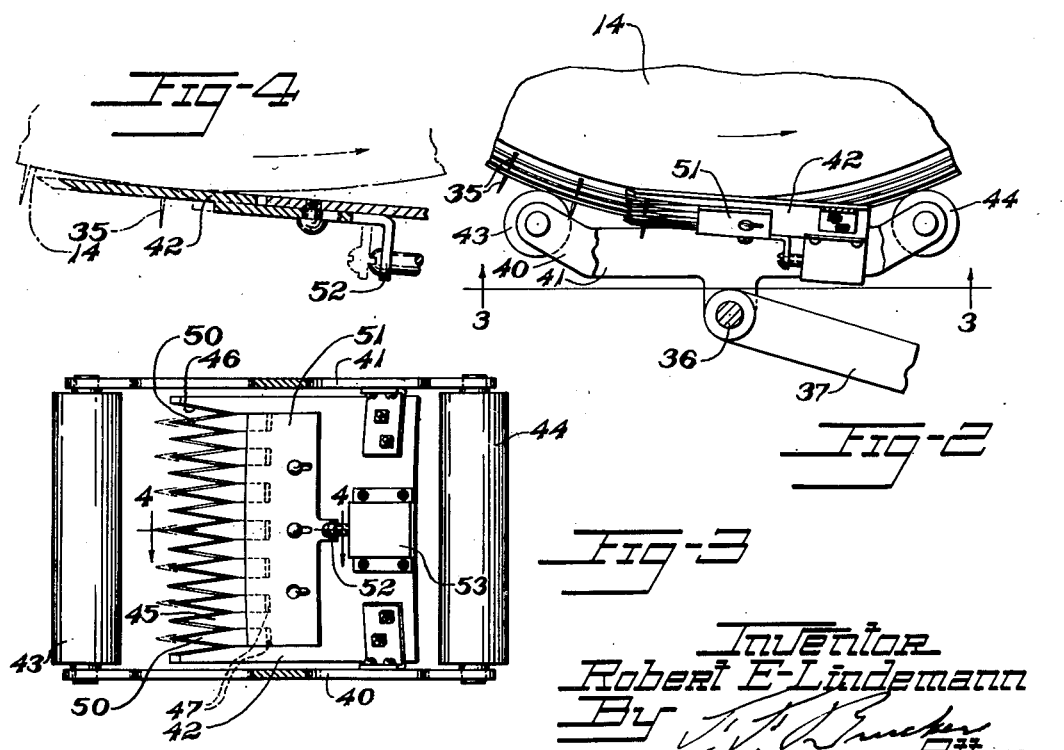
Inventor
Robert E. Lindemann Patented July 15, 1952

2,603,290

UNITED STATES PATENT OFFICE 2,603,290

TRIMMING APPARATUS

Robert E. Lindemann, Le Roy, Ohio, assignor to
The B. F. Goodrich Company, New York, N. Y.,
a corporation of New York Application April 29, 1949, Serial No. 90,400

10 Claims. (Cl. 164—48)

This invention relates to apparatus for trimming elements and is especially useful in trimming protuberances from annular tire articles of resilient rubber-like material.

In the molding of rubber articles it has been customary to provide drilled vent holes in the impervious metal molds to permit entrapped air to escape from the mold cavities and to provide for complete filling of the mold cavities with rubber. In the manufacture of rubber articles with vented molds, the rubber material has flowed into the vent openings where it is molded to form undesirable protuberances on the articles. It has been proposed to provide knives having V-shaped notches in their sharpened edges and to trim the protuberances by relative motion between the knives and the articles. Such devices, while eliminating most of the hand trimming have not been completely satisfactory as sometimes the protuberances jamb in the throat of the knife and interfere with proper cutting.

It is an object of the present invention to provide for clearing of protuberances from the knife.

Other objects are to provide more effectively for trimming the protuberances from a rotatable annular tire article, to provide an oscillating movement of the knife clearing means, and to maintain contact of the trimming means with the article.

These and other objects will appear from the following description and the accompanying drawings.

Of the drawings,

Fig. 1 is a side elevation of a trimming apparatus constructed in accordance with and embodying the invention, parts being broken away.

Fig. 2 is an enlarged side view of the trimming mechanism, parts being broken away.

Fig. 3 is a plan view thereof, parts being broken away.

Fig. 4 is a sectional view, taken on line 4—4 of Fig. 3.

Referring to the drawings which show the invention as applied to apparatus for trimming an annular tire casing, the numerals 10, 11 designate a pair of V-grooved driving wheels fixed on parallel shafts 12, 13 in alignment with each other for rotating a tire casing 14 resting thereon about its axis of rotation for movement of its periphery in a course about its axis. Shafts 12, 13 also have sprockets fixed thereto connected by a driving chain 15. A motor 16 drives the shaft 12 by means of a sprocket 17 on the motor shaft, a sprocket 18 on shaft 12, and a chain 19 connecting the sprockets 17 and 18.

An inclined runway 20 is provided to deliver tires to the trimming mechanism and a runway 21 is provided to take the tires away. Fences 22, 23 are provided at each side of the runways to guide the tires in on edge position. Fences 24, 25 join the fences 22, 23 in the region of the driving wheels. For further supporting the tire, a grooved roller 26 is mounted for free rotation on an arm 27 arranged to swing vertically about a pivot 28. A double acting fluid pressure cylinder 29 is pivotally mounted at 30 and its piston rod is pivotally connected to the arm 27 at 31. The arrangement is such that the arm 27 may be raised to the dot and dash position of Fig. 1 to permit a tire to roll onto the cradle wheels 10, 11 or may be lowered to the full line position to press downwardly on the tire and hold it in engagement with rollers 10, 11.

The means for trimming the protuberances 35 is pivotally mounted at 36 to an arm 37. Arm 37 is pivoted at 38 to the frame supporting the wheels 10, 11 and the opposite end of arm 37 carries a counter-weight 39 which acts to press the trimming mechanism radially against the tire. The trimmer includes frame pieces 40, 41 having a comb-like trimming blade 42 fixed thereto and a pair of rollers 43, 44 rotatably mounted therein for engaging the tread of the tire and limiting movement of arm 37. Trimming blade 42 has a set of pointed fingers extending in the direction of the course of the periphery of the tire. These fingers are sharply pointed and have their side edges sharpened, as at 46. Between the fingers 45 are slots 47 in which are slideably mounted a second set of fingers 50 similarly pointed and sharpened and in the same plane. The second set of fingers are in intercalated relation to the fingers 45 and are secured to a cross head 51 to provide a second comb-like member. The cross head is in turn connected as at 52, to an electric vibrator 53, the arrangement being such that by operation of the vibrator, fingers 50 are moved in slots 47 toward and from roller 43 in the direction of the course of the periphery of the tire. The two sets of sharpened fingers provide a comb-like structure in the path of the protuberances. Alternate fingers have reciprocating movement relative to the remaining fingers in the general direction of their sharpened side margins or in the direction of the course of movement of the periphery of the tire, and the adjacent side margins collectively provide V-shaped slots in which the protuberances enter and become caught. The fingers press laterally against the protuberances. Due to the V-shape of the slots and the reciprocatory movement of one set of fingers, the knife edges tend to roll and twist the protuberances therebetween to sever them.

Due to the movement of the fingers or knives, the trimmer frees itself and does not become clogged as with former devices in which the knife edges were all fixed relative to each other. The relatively moving knife edges roll the protuberances between them and the knife edges are forced through the rubber by a draw cut.

Variations may be made without departing from the scope of the invention as it is defined by the following claims.

I claim:

1. Apparatus for trimming protuberances from an annular article of rubber-like material, said apparatus comprising means for supporting and rotating the article for movement of its periphery in a course about its axis and trimming means adjustable toward and from said course, said trimming means comprising sharp edged fingers extending in a direction opposite to the direction of rotation of the article in said course, and means providing a reciprocatory movement of at least one of the fingers relative to another of the fingers in the direction of their extent of the article.

2. Apparatus for trimming protuberances from an annular article of rubber-like material, said apparatus comprising means for supporting and rotating the article for movement of its periphery in a course about its axis, trimming means mounted for movement radially of said axis, and means for pressing the trimming means toward said axis, said trimming means comprising sharp-edged fingers extending in a direction opposite to the direction of rotation of the article, and means providing a reciprocatory movement of some of the fingers relative to other of the fingers in the direction of their extent.

3. Apparatus for trimming protuberances from an annular article of rubber-like material, said apparatus comprising means for supporting and rotating the article for movement of its periphery in a course about its axis, trimming means mounted for movement toward and from said course, said trimming means comprising a set of sharp edged fingers extending in a direction opposite to the direction of rotation of the article in spaced apart relation, a second set of similar fingers extending in the same direction with the fingers of said second set in intercalated arrangement with the fingers of the first said set, and means providing reciprocating movement of said second set of fingers relative to the first said set of fingers in the direction of their extent.

4. Apparatus for trimming protuberances from an annular article of rubber-like material, said apparatus comprising means for supporting and rotating the article for movement of its periphery in a course about its axis and trimming means mounted for movement toward and from said course, said trimming means comprising a set of sharp edged fingers extending in a direction opposite to the direction of rotation of the article in spaced apart relation, a second set of similar fingers extending in the same direction with the fingers of said second set in intercalated arrangement with the fingers of the first said set and means providing reciprocating movement of said second set of fingers in a direction parallel to said first set of fingers.

5. Apparatus for trimming protuberances from an annular article of rubber-like material, said apparatus comprising means for supporting and rotating the article for movement of its periphery in a course about its axis, trimming means mounted for movement toward and from said course, and means for holding the trimming means in said course, said trimming means comprising a set of sharp edged fingers extending in a direction opposite to the direction of rotation of the article in spaced apart relation, rollers mounted thereon to gage approach of the fingers to the surface of the article, a second set of similar fingers extending in the same direction with the fingers of said second set in intercalated arrangement with the fingers of the first said set, and means providing a reciprocating movement of said second set of fingers in the direction of extent of the fingers of the first said set.

6. Apparatus for trimming protuberances from articles, said apparatus comprising a comb-like member having fingers extending in one direction, a second comb-like member having blades extending in the same direction as said fingers and arranged in intercalated relation to said fingers, and means providing a reciprocating movement of one of said comb-like members relative to the other in the said direction of extent of said fingers for engaging the protuberances therebetween.

7. Apparatus for trimming protuberances from articles, said apparatus comprising a comb-like member having fingers extending in one direction, a second comb-like member having blades extending in the same direction as said fingers, said blades being located between said fingers and providing with said fingers open slots therebetween for engaging said protuberances, and means providing a reciprocating movement of one of said comb-like members relative to the other in the said direction of extent of said fingers for engaging the protuberances therebetween.

8. Apparatus for trimming protuberances from a rubber article, said apparatus comprising trimming means including a backing structure having a plurality of sharp-edged fingers extending in side-by-side relation along said structure and projecting in a single direction therefrom with protuberance-receiving spaces between the edges of said fingers, means for reciprocating some of the fingers in said direction of their extent to provide relative longitudinal movement of the fingers, and means for supporting said trimming means and the rubber article for movement of one relative to the other with said fingers positioned at the surface of the article for engaging protuberances thereon during such relative movement.

9. Apparatus for trimming protuberances from a rubber article, said apparatus comprising trimming means including a backing structure having a plurality of sharp-edged fingers extending in side-by-side relation along said structure and projecting in a single direction therefrom with protuberance-receiving spaces between the edges of said fingers, means for reciprocating some of said fingers in said direction of extent of the fingers to provide relative longitudinal movement of the fingers, and means for supporting said trimming means and the rubber article for movement of one relative to the other in said direction of extent of the fingers to force the protuberances on the article into the spaces between said fingers with said fingers positioned at the surface of the article for engaging protuberances thereon during such relative movement.

10. Apparatus for trimming protuberances from a rubber article, said apparatus comprising a carriage mounted to contact a surface of the article, means providing relative movement of the surface of said article and said carriage in one direction, a comb-like cutting member mounted on said carriage and having spaced-apart fingers extending parallel to the said direction of relative movement, said fingers having sharp cutting edges defining converging spaces therebetween for receiving said protuberances, a second comb-like member having fingers located for movement in said spaces, and means on said carriage for providing a reciprocating movement of one comb-like member relative to the other in direction of extent of said fingers to clear said spaces of protuberances.

ROBERT E. LINDEMANN.

REFERENCES CITED

The following references are of record in the file of this patent:

UNITED STATES PATENTS

| Number | Name | Date |
|---|---|---|
| 1,983,684 | Strong | Dec. 11, 1934 |
| 2,220,022 | Pool | Oct. 29, 1940 |